United States Patent
Sy et al.

(10) Patent No.: US 8,035,030 B2
(45) Date of Patent: Oct. 11, 2011

(54) HERMETICALLY SEALED ELECTRICAL CONNECTION ASSEMBLY

(75) Inventors: Williamson Sy, Tokyo (JP); John Casari, Manchester, MI (US); Paul Wickett, Northville, MI (US)

(73) Assignee: Robert Bosch GmbH, Stuttgart (DE)

( * ) Notice: Subject to any disclaimer, the term of this patent is extended or adjusted under 35 U.S.C. 154(b) by 376 days.

(21) Appl. No.: 12/422,731

(22) Filed: Apr. 13, 2009

(65) Prior Publication Data

US 2010/0258330 A1     Oct. 14, 2010

(51) Int. Cl.
  *H01J 5/00*  (2006.01)
  *H01J 15/00*  (2006.01)
  *H05K 5/06*  (2006.01)
(52) U.S. Cl. .................... 174/50.52; 174/77 R
(58) Field of Classification Search .......... 174/50.52, 174/50.53, 77 R, 564
See application file for complete search history.

(56) References Cited

U.S. PATENT DOCUMENTS

| | | | |
|---|---|---|---|
| 2,192,751 A | 3/1940 | Melchior et al. | |
| 3,520,049 A | 7/1970 | Lysenko et al. | |
| 3,683,331 A | 8/1972 | Overholser | |
| 3,857,280 A | 12/1974 | Panzeri | |
| 4,871,328 A | 10/1989 | Wright et al. | |
| 4,894,630 A * | 1/1990 | Ueta et al. | 333/185 |
| 4,976,634 A | 12/1990 | Green et al. | |
| 5,041,019 A | 8/1991 | Sharp et al. | |
| 5,186,380 A | 2/1993 | Beeferman et al. | |
| 5,295,866 A | 3/1994 | Kroger et al. | |
| 5,736,675 A * | 4/1998 | Michaels | 174/50.5 |
| 5,791,911 A | 8/1998 | Fasano et al. | |
| 5,940,966 A | 8/1999 | Fasano et al. | |
| 5,981,921 A | 11/1999 | Yablochnikov | |
| 6,086,383 A | 7/2000 | Fasano et al. | |
| 6,137,094 A | 10/2000 | Kistersky et al. | |
| 6,478,619 B1 | 11/2002 | Wiechmann | |
| 6,492,590 B1 * | 12/2002 | Cheng | 174/50 |
| 6,574,119 B2 * | 6/2003 | Kaltenbach | 361/807 |
| 6,683,250 B2 * | 1/2004 | Luettgen et al. | 174/544 |
| 6,737,579 B1 * | 5/2004 | Laufer et al. | 174/50.52 |
| 6,804,448 B2 * | 10/2004 | Chang | 385/140 |
| 6,818,829 B1 * | 11/2004 | McMillan et al. | 174/74 R |

(Continued)

OTHER PUBLICATIONS

Spitz, B. and Shribman, V., "Magnetic pulse welding for tubular applications: Discovering new technology for welding conductive materials," TPJ—The Tube & Pipe Journal, Jul. 26, 2001, 3 pages, Retrieved from thefabricator com website on Dec. 29, 2008 at http://www.thefabricator.com/TubePipeFabrication/TubePipeFabrication_Article.cfm? ID=54.

(Continued)

*Primary Examiner* — Hung Ngo
(74) *Attorney, Agent, or Firm* — Michael Best & Friedrich LLP

(57) ABSTRACT

A method of manufacturing a hermetically sealed electrical connection is provided. The method includes providing an electrically conductive wire, surrounding the electrically conductive wire with a metal layer, providing an insulating layer between the metal layer and the electrically conductive wire, and applying a magnetically-induced compressive force to the metal layer such that the metal layer is compressed against the insulating layer and the insulating layer is compressed against the electrically conductive wire to form a hermetic seal between the metal layer and the conductive wire while maintaining the insulating layer therebetween.

21 Claims, 4 Drawing Sheets

U.S. PATENT DOCUMENTS

| | | | | |
|---|---|---|---|---|
| 6,825,417 B2 * | 11/2004 | Ball | ............................ | 174/74 R |
| 7,002,084 B2 * | 2/2006 | Cox et al. | ....................... | 177/238 |
| 7,144,274 B2 | 12/2006 | Taylor | | |
| 7,300,310 B2 | 11/2007 | Taylor | | |
| 7,364,062 B2 | 4/2008 | Moore | | |
| 7,495,172 B2 * | 2/2009 | Amerpohl | .................... | 174/73.1 |
| 7,568,958 B2 * | 8/2009 | Vigier | ............................ | 439/876 |
| 7,598,278 B2 * | 10/2009 | Dalko et al. | ................. | 514/354 |

OTHER PUBLICATIONS

"MP-Weld—Magnetic Pulse Welding," 2006, 3 pages, Retrieved from the Pulsar website on Jun. 2, 2008 at http://www.pulsar.co.il/technology/?did=16.

Lucanex technical data sheet, Jun. 2008, 3 pages, Retrieved from the LucasMilhaupt website at http://www.lucasmilhaupt.com/assets/brazing_products/technical_data_sheets/lucanex.pdf.

\* cited by examiner

HERMETICALLY SEALED ELECTRICAL CONNECTION ASSEMBLY

FIELD OF THE INVENTION

The present invention relates to a method of manufacturing a hermetically sealed electrical connection. More particularly, the invention relates to a hermetically sealed housing for electronic components.

BACKGROUND

Housings for electronic components typically enclose electrical circuitry to protect it from damage. However, electrical circuitry often requires more than one conductive path between the inside and the outside of the housing (e.g., one conductive path for providing power to the circuitry and one conductive path for grounding the circuitry). Thus, electrical wires may be passed through apertures in the housing. Because the apertures also allow potentially damaging substances (e.g., liquids, debris, etc.) to enter the housing, the housing and/or the circuitry is often sealed.

Sealing may be accomplished in several ways. For example, an organic material may be used to seal the housing and/or the circuitry, forming a seal between the wires and the housing. Organic materials insulate the conductive paths through the housing while sealing the housing to help protect the electronics from foreign matter that may cause damage to the electronics.

Some housings are attempted to be sealed by press-fitting two inorganic materials together to both seal and insulate the conductive paths. Sometimes, an adhesive is included between the inorganic materials. Other attempts to seal include the use of brazing. Typical methods of brazing include joining two metals by heating and melting a thin layer of brazing material between them. The brazing material cools and acts like a glue to hold the two metals together.

SUMMARY

The above-mentioned attempts to seal have many disadvantages. One disadvantage of using organic materials is that they are susceptible to permeation, especially permeation by organic molecules. Ceramics are brittle and may be degraded or destroyed in the sealing process. Press-fitting two inorganic materials together may provide good insulative properties, but the press-fit seals do not provide sufficient sealing properties and remain susceptible to permeation. Sealing methods that use brazing are undesirable because brazing requires additional material and the heating process may cause damage to the materials being joined. Additionally, there is significant stress on the brazing material, making it difficult to find the right brazing material to use.

Thus, the present invention provides an improved, hermetically sealed electrical connection and a method for achieving the same.

In one embodiment, the invention provides a method of manufacturing a hermetically sealed electrical connection. The method includes providing an electrically conductive wire, surrounding the electrically conductive wire with a metal layer, providing an insulating layer between the metal layer and the electrically conductive wire, and applying a magnetically-induced compressive force to the metal layer such that the metal layer is compressed against the insulating layer and the insulating layer is compressed against the electrically conductive wire to form a hermetic seal between the metal layer and the conductive wire while maintaining the insulating layer therebetween.

In another embodiment the invention provides a hermetically sealed electrical connection. The hermetically sealed electrical connection includes an electrically conductive wire, an insulator surrounding the conductive wire, and a metal layer surrounding the insulator and the electrically conductive wire, the metal layer compressed against the insulator and the insulator compressed against the electrically conductive wire by a magnetically-induced compressive force such that a hermetic seal is formed between the electrically conductive wire and the metal layer.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Figure 1:
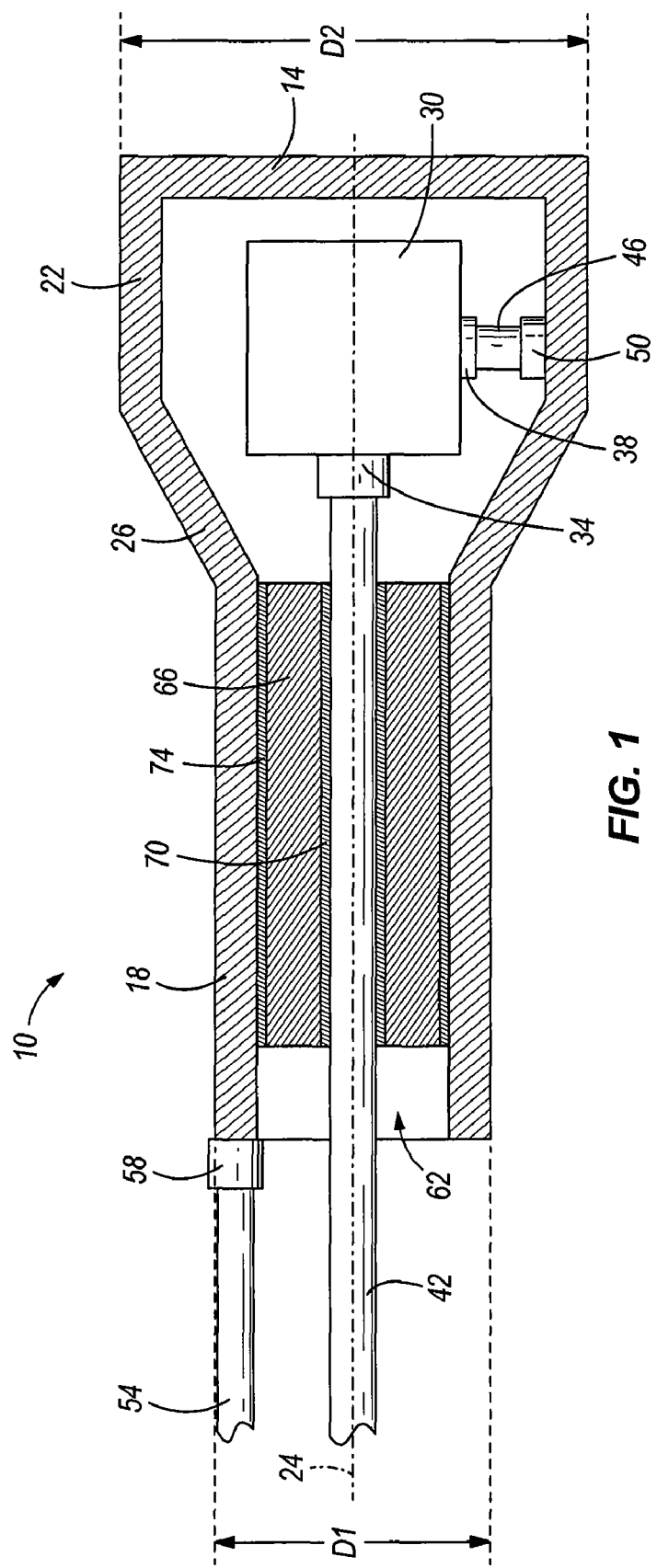
FIG. 1 is a schematic view of a hermetically sealed electrical connection assembly embodying the invention.

FIG. 1 schematically illustrates an electrical assembly 10 that includes a housing 14. It should be initially noted that the illustrated thicknesses of the components are not necessarily shown to scale. The electrical connection assembly 10 may be part of an automotive component in a fuel system and may be in contact with wet fuel.

The illustrated housing 14 is formed of an electrically conductive metal (e.g., aluminum) and includes an elongated body 18 and an enlarged end 22, formed together as one piece. The body 18 is substantially cylindrical, in the shape of a tube, with a substantially constant body diameter D1 along an axis 24 defined through the center of the housing 14. The enlarged end 22 is also substantially cylindrical, with a substantially constant end diameter D2 and a transition portion 26 with a diameter that decreases from the end diameter D2 to the body diameter D1. In other constructions, the housing may be formed with a different cross-sectional shape (e.g., square, rectangular, polygonal, etc.). In yet other constructions, the housing may be formed of a different metal or a different material. Of course, the housing may also contain protective layers or coatings of material that are not illustrated in FIG. 1 for clarity.

The enlarged end 22 substantially surrounds and protects electrical circuitry 30. The electrical circuitry 30 requires power to perform a desired function. Thus, the electrical circuitry 30 may have a power connection and a ground connection. Power is provided to the electrical circuitry 30 through a first electrically conductive wire 42 (e.g., copper or other suitable conductive materials) that passes through the body 18 of the housing and extends into the enlarged end 22. The first wire 42 is electrically connected to the electrical circuitry 30 (shown at 34) via soldering or other known methods. The electrical circuitry 30 is grounded by electrically connecting a second electrically conductive wire 46 to the electrical circuitry (shown at 38) and to the housing (shown at 50) via soldering or other known methods. A third electrically conductive wire 54 may be electrically connected to the outside of the housing (shown at 58) to provide grounding to the housing 14 and to the electrical circuitry 30. In other constructions, a different number of electrically conductive wires may pass through the housing 14. For example, the electrical circuitry 30 may provide an output signal that is transmitted outside the housing via a fourth electrically conductive wire.

Because the electrical circuitry 30 may be damaged by environmental factors, it is desirable to seal the body 18 of the housing 14 to prevent foreign matter (e.g., liquids, debris, etc.) from entering the enlarged end 22 and coming into contact with the electrical circuitry 30. As illustrated in FIG. 1, the housing 14 is hermetically sealed to substantially prevent any liquids, solids, or gasses from passing between the outside environment and the cavity formed by the enlarged end 22. The hermetic seal 62 is formed between the elongated body 18 of the housing 14 and the wire 42 using a metal layer 66, a first or inner insulating layer 70, and a second or outer insulating layer 74.

The illustrated metal layer 66 is aluminum and is formed as a substantially cylindrical tube. The metal layer 66 (also referred to as a metal tube) surrounds the wire 42 and provides an electrically conductive layer between the wire 42 and the housing 14. The metal tube 66 is positioned substantially co-axially with the first wire 42 such that the axis 24 passes through the center of the metal tube 66. In other constructions, the metal layer may be formed of a different metal or may be formed of a non-conductive or poorly-conductive material. In yet other constructions, the metal layer may be formed with a different cross-sectional shape.

The inner insulating layer 70 forms a substantially cylindrical layer and is positioned between the wire 42 and the metal tube 66 to electrically insulate the wire 42 from the metal tube 66. Similarly, the outer insulating layer 74 forms a substantially cylindrical layer and is positioned between the metal tube 66 and the housing 14 to electrically insulate the metal tube 66 from the housing 14. The illustrated insulative layers 70, 74 are formed of aluminum oxide, which is formed by oxidizing the inner and outer cylindrical surfaces of the metal tube 66. Thus, the insulating layers 70, 74 are formed on the metal tube 66 such that the metal tube 66, inner insulating layer 70, and outer insulating layer 74 are one tube-like structure. Of course, if the metal tube 66 is formed of a different metal (e.g., titanium or magnesium), the oxidation layer and therefore the insulating layers 70, 74 will be a different composition with different properties. In other constructions, the cross-sectional shapes of the insulating layers 70, 74 may be different.

In other constructions, a different insulating material may be used that is formed separate from the metal tube 66. Separately formed insulating layers may be more difficult to handle because the separately formed insulating layers will be thinner than the metal tube 66 with oxidized insulating layers 70, 74 formed thereon. Also, the thickness of the separately formed insulating layers should be chosen carefully because the thickness may affect properties such as brittleness and the ability to withstand deformation. Thus, if the separately formed insulating layers are formed too thin, they may become difficult to handle without causing damage. However, if the separately formed insulating layers are formed too thick, they may become brittle. The separately formed insulating layers may be formed of an insulating material that is somewhat flexible but still substantially impermeable to liquids, solids, and gasses.

One advantage of using oxidation to form the insulating layers 70, 74 directly on the metal tube 66 includes ease of handling the insulating layers 70, 74 because they may be handled together with the metal tube 66 as one tube-like structure. Another advantage is the formation of very thin insulating layers 70, 74 on the metal tube 66. Finally, the process of oxidation is more cost effective than manufacturing an insulating material, or insulating layers, separate from the metal tube 66. However, oxidation limits the type of insulating layers formed on a particular metal tube 66 to the oxide corresponding to the type of metal that forms the metal tube 66. Thus, if the properties of one type of metal are desired for the metal tube 66, and a set of properties are desired for the insulating layers that are not present in the corresponding metal oxide, then separately formed insulating layers may be desired.

A magnetically-induced compressive force is applied and results in the formation of the hermetic seal 62 between the wire 42 and the housing 14. More specifically, the application of the compressive force in a direction normal to the axis 24 compresses the housing 14 against the outer insulative layer 74, the outer insulative layer 74 against the metal layer 66, the metal layer 66 against the inner insulative layer 70, and the inner insulative layer 70 against the wire 42 to form a hermetic seal as described below.

Figure 2:
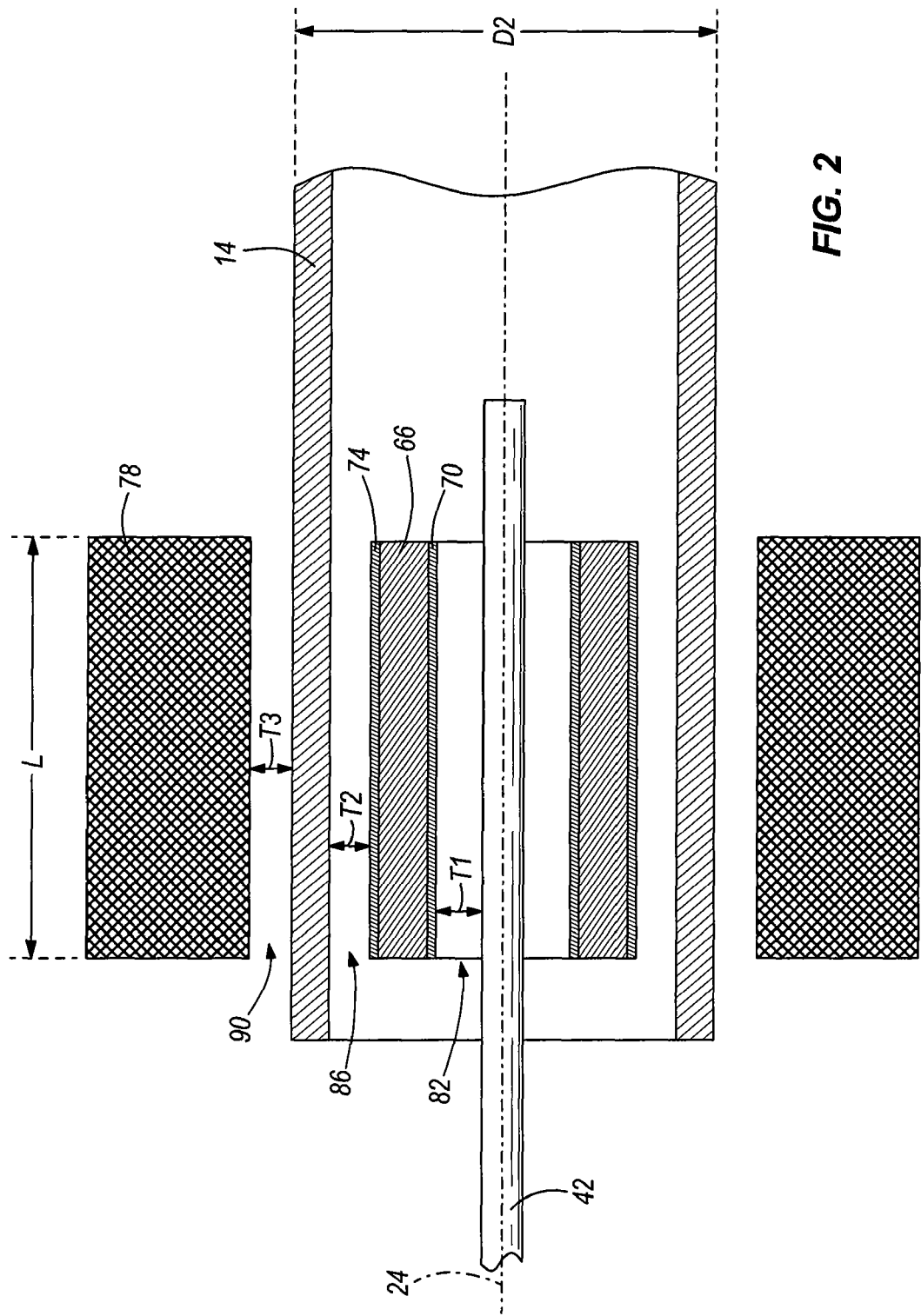
FIG. 2 is an exploded schematic view of the electrical connection assembly of FIG. 1 surrounded by a magnetic coil prior to energizing the coil.
Figure 3:
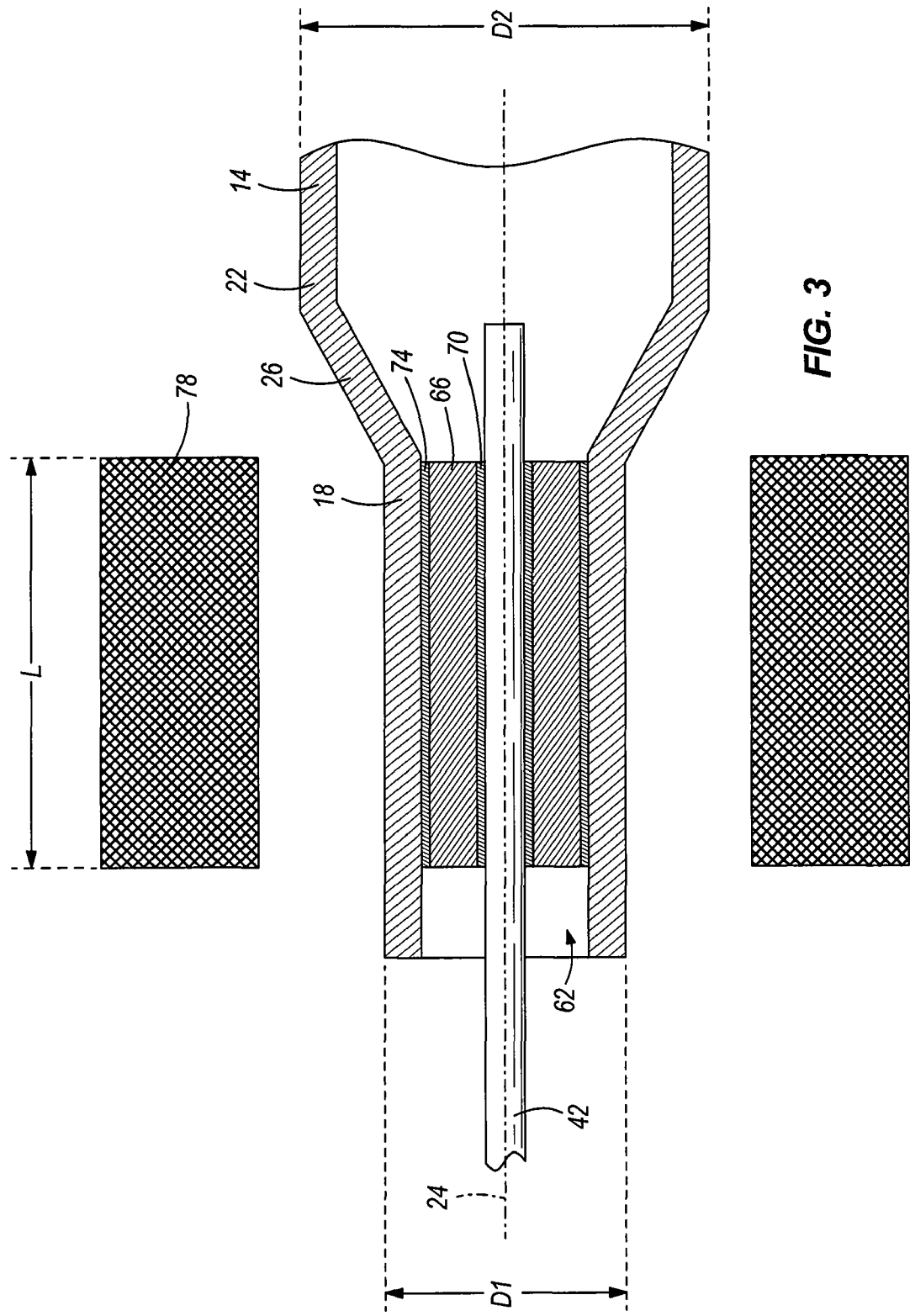
FIG. 3 is a schematic view of the electrical connection assembly of FIG. 2 surrounded by a magnetic coil after energizing the coil.

FIGS. 2 and 3 schematically illustrate one method of forming the hermetic seal 62 using equipment used for magnetic pulse (MP) welding. It should be initially noted that the thicknesses of the components and the distances or gaps therebetween are not necessarily shown to scale.

Traditional MP welding is commonly used to weld dissimilar metals and has many advantages. MP welding does not require any filler material, shielding gasses, fluxes, etc. The process does not produce heat, so the components being welded are not exposed to potentially damaging temperatures. The process occurs extremely fast, typically in less than 100 microseconds and may be performed for a tube with almost any cross-sectional shape (e.g., circular, rectangular, polygonal, etc.). One advantage for traditional uses of MP welding is that standard cleaning of the surfaces to be welded is often sufficient because MP welding typically breaks down thin oxide layers and ejects dirt from the weld area to achieve metal-to-metal welding. As described further below, features of known MP welding techniques are used by the present invention to create the magnetically-induced compressive force, but not to the extent that metals are actually welded together or any insulating oxide layers between metal layers are removed or degraded.

With reference to FIG. 2, the wire 42, metal tube 66, inner and outer insulating layers 70, 74, and housing 14 are arranged as shown, substantially coaxial with the axis 24.

Before the compression force is applied, the housing 14 is a substantially cylindrical metal tube. A first gap 82 with thickness T1 exists between the wire 42 and the inner insulating layer 70 and a second gap 86 with thickness T2 exists between the outer insulating layer 74 and the housing 14. A magnetic coil 78 is positioned to surround the housing 14, metal tube 66, inner and outer insulating layers 70, 74, and wire 42. The magnetic coil 78 is substantially cylindrical and extends a length L in a direction substantially parallel to the axis 24. A third gap 90 with thickness T3 exists between the housing 14 and the magnetic coil 78. It should be noted that the gaps 82, 86, 90 and thicknesses T1, T2, T3 are exaggerated for clarity.

To create the compressive force, a high energy current is applied to the magnetic coil 78. The current may be applied by discharging at least one capacitor or by other methods common to MP welding equipment. The high energy current creates a first magnetic field in the magnetic coil 78 that extends along the entire length of the magnetic coil 78. The first magnetic field induces an eddy current in the housing 14, which causes a second magnetic field to be created in the housing 14 that opposes the first magnetic field. Because the first magnetic field is significantly stronger than the second magnetic field, the first magnetic field forces the housing 14 to accelerate through the gap 86 and away from the magnetic coil 78 in a direction perpendicular to the axis 24. Thus, a strong compressive force is exerted on the housing 14 without any physical contact between the device generating the compressive force (i.e., the coil 78) and the housing 14 in a direction that is substantially perpendicular to the axis 24.

As illustrated in FIG. 3, only a portion of the housing 14 is accelerated toward the axis 24. The compressive force causes the housing 14 to collapse along a portion generally aligned with the length L of the magnetic coil 78. The collapse causes a necking down of the housing 14, resulting in the formation of the enlarged end 22, transition portion 26, and elongated body 18. Furthermore, the compressive force compresses the housing 14 against the outer insulative layer 74, the outer insulative layer 74 against the metal layer 66, the metal layer 66 against the inner insulative layer 70, and the inner insulative layer 70 against the wire 42, thus sandwiching the layers together to form the hermetic seal 62.

Alternatively, the hermetic seal 62 may be formed in two or more compression steps. For example, a first magnetically-induced compressive force may be applied to the metal layer 66 without any physical contact between the device generating the compressive force (i.e., the coil 78) and the metal layer 66. The compressive force compresses the metal layer 66 against the first insulative layer 70 and the first insulative layer 70 against the wire 42 to sandwich the layers together to form a hermetic seal. Then, a second magnetically-induced compressive force may be applied to the housing 14 without any physical contact between the coil 78 and the housing 14. The compressive force compresses the housing 14 against the outer insulative layer 74 and the outer insulative layer 74 against the metal layer 66 to sandwich the layers together to form the hermetic seal 62 between the housing 14 and the wire 42.

The strength of the compressive force produced depends on many variables, such as the thicknesses of the gaps between layers, the materials used, the sizes and shapes of the materials used, the size of the magnetic coil 78, and the amplitude and frequency of the current applied to the magnetic coil 78. The variables may be adjusted such that the compressive force generated is strong enough to compress the layers and form a hermetic seal 62, yet weak enough that no metal-to-metal welding of the conductive wire 42 to the metal tube 66, or the metal tube 66 to the housing 14 occurs, and no degradation of the first and second insulative layers 70, 74 occurs.

For example, the gap 86 (see FIG. 2) must exist between the housing 14 and the outer insulating layer 74 to provide sufficient space in which the housing 14 can accelerate. If the gap 86 has a thickness T2 that is too small, the housing 14 will not impact the outer insulative layer 74 with enough force for a hermetic seal to be achieved. On the other hand, if the gap 86 is too large, the housing 14 may be accelerated to such a degree that upon impact the outer insulative layer 74 is at least partially broken or removed such that a conductive, metal-to-metal weld is formed between the housing 14 and the metal tube 66. Thus, the gap thickness 86 and the current applied to the coil 78 may be adjusted to achieve different strengths of compression to ensure the formation of a proper hermetic seal while ensuring the outer insulating layer 74 remains fully intact. The insulative layers 70, 74 are not destroyed or degraded in the process and provide the necessary non-conductive insulation between the wire 42, metal tube 66, and housing 14.

Changes in the thickness T3 of the gap 90 between the magnetic coil 78 and the housing 14 affect the strength at which the first and second magnetic fields repel each other. The larger the thickness T3, the weaker the compression force and vice versa. The current applied to the magnetic coil 78 directly influences the strength of the magnetic field produced in the coil 78 as well as the amplitude of the eddy current induced in the housing 14. Thus, the current applied to the magnetic coil 78 also affects the strength of the compression force exerted on the housing 14. These and other variables may be adjusted as desired to produce the proper hermetic seal between the layers.

Other methods of forming the hermetic seal 62 may include the use of other types of pressure welding or crimping techniques that produce a compressive force that collapses the layers with enough force to create a hermetic seal between layers but not with enough force to cause any metal-to-metal welding together of the conductive metal layers. Thus, the inner and outer insulating layers 70, 74 remain intact and provide an electrically insulating layer between the electrically conductive wire 42, metal tube 66, and housing 14.

Figure 4:
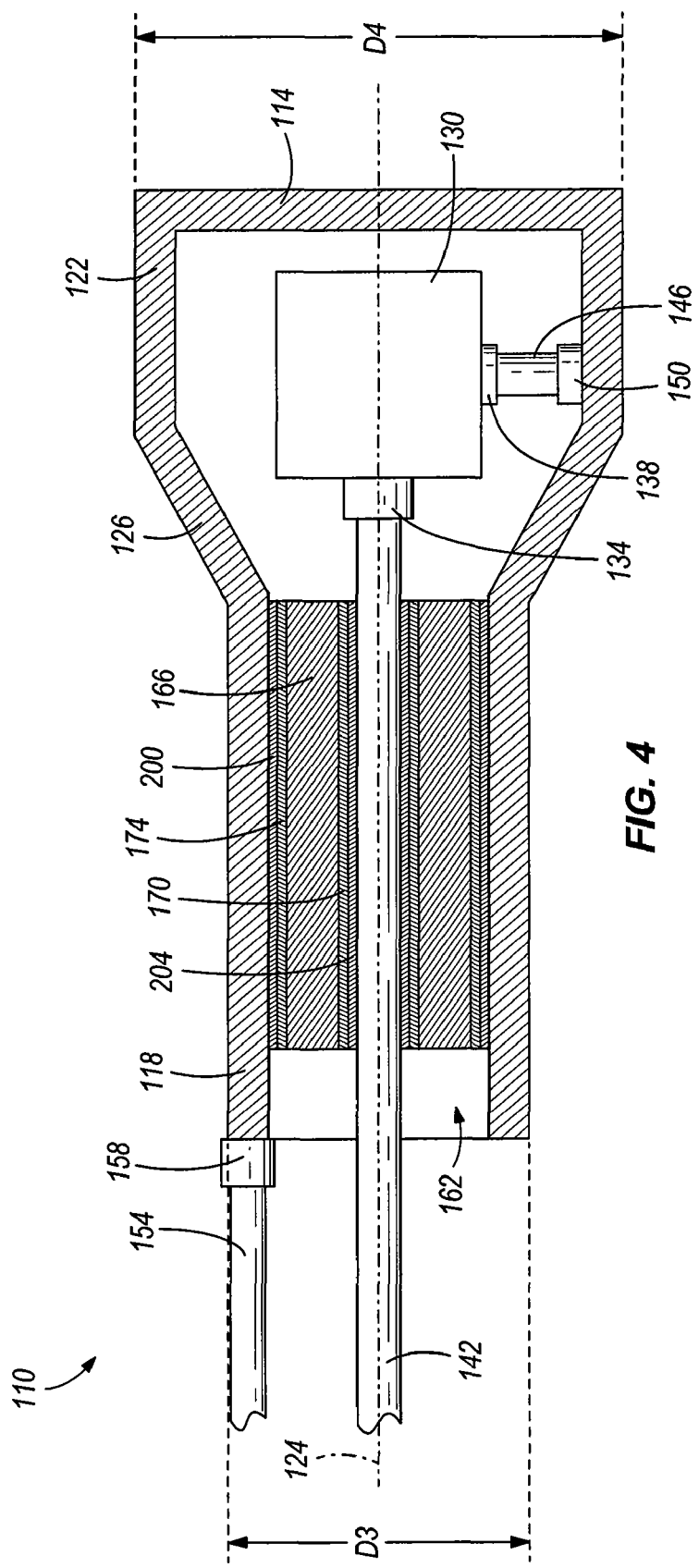
FIG. 4 is a schematic view of a second construction of a hermetically sealed electrical connection assembly that includes an active metal compound layer.

FIG. 4 schematically illustrates a second construction of the present invention. The hermetically sealed electrical connection assembly 110 is similar to the electrical connection assembly 10 shown in FIG. 1, except two additional layers 200, 204 are used to help form the hermetic seal 162 between the housing 114 and the electrically conductive wire 142.

The hermetic seal 162 is formed in a similar manner as the hermetic seal 62 described with respect to FIGS. 1-3 and like components have been given like reference numbers of the 100 series. Thus, only the differences will be discussed in detail. If the insulating layers 170, 174 formed on the outer surfaces of the metal tube 166 do not bond well with the wire 142 or the housing 114, a hermetic seal may not form between the layers. An outer active metal compound layer 200 may be inserted between the outer insulating layer 174 and the housing 114, and an inner active metal compound layer 204 may be inserted between the wire 142 and the inner insulating layer 170 before the compressive force is applied. The active metal compound layers 200, 204 aid in the formation of the hermetic seal 162 by increasing the binding strength between the insulating layers 170, 174, the wire 142, and the housing 114. One example of an active metal compound that may be used with the illustrated embodiment is sold under the trademark LUCANEX and is available from Lucas-Milhaupt, Inc. of Cudahy, Wis. Of course, other suitable active metal compounds can also be used.

Thus, the invention provides, among other things, a method of manufacturing a hermetically sealed electric component that does not require the use of special techniques or shielding materials to avoid damaging the insulating layers. Various features and advantages of the invention are set forth in the following claims.

What is claimed is:

1. A method of manufacturing a hermetically sealed electrical connection, the method comprising:
   providing an electrically conductive wire;
   surrounding the electrically conductive wire with a metal layer;
   providing an insulating layer between the metal layer and the electrically conductive wire; and
   applying a magnetically-induced compressive force to the metal layer such that the metal layer is compressed against the insulating layer and the insulating layer is compressed against the electrically conductive wire to form a hermetic seal between the metal layer and the electrically conductive wire while maintaining the insulating layer therebetween.

2. The method of claim 1, wherein applying a magnetically-induced compressive force to the metal layer includes:
   surrounding the electrically conductive wire, the insulating layer, and the metal layer with a coil; and
   directing a current through the coil to create a first magnetic field and induce a second current in the metal layer, the second current creating a second magnetic field opposite the first magnetic field such that the magnetic fields oppose each other to accelerate the metal layer away from the coil toward the electrically conductive wire to compress the metal layer and the insulating layer around the electrically conductive wire, forming the hermetically sealed electrical connection while maintaining the insulating layer.

3. The method of claim 1, wherein the magnetically-induced compressive force is applied without physical contact between the metal layer and a device generating the magnetically-induced compressive force.

4. The method of claim 1, wherein no metal-to-metal welding occurs with the metal layer and the electrically conductive wire.

5. The method of claim 1, wherein the step of providing an insulating layer between the metal layer and the electrically conductive wire further includes oxidizing an inner surface of the metal layer.

6. The method of claim 1, further including:
   surrounding the electrically conductive wire with an active metal compound layer; and
   applying a magnetically-induced compressive force to the metal layer such that the metal layer is compressed against the insulating layer, the insulating layer is compressed against the active metal compound layer, and the active metal compound layer is compressed against the electrically conductive wire to form a hermetic seal between the metal layer and the electrically conductive wire while maintaining the insulating layer and the active metal compound layer therebetween.

7. The method of claim 1, wherein the insulating layer is a first insulating layer and further including:
   surrounding the metal layer with a housing; and
   providing a second insulating layer between the housing and the metal layer; and
   applying the magnetically-induced compressive force to the housing such that the housing is compressed against the second insulating layer, the second insulating layer is compressed against the metal layer, the metal layer is compressed against the first insulating layer and the first insulating layer is compressed against the electrically conductive wire to form a hermetic seal between the housing and the electrically conductive wire while maintaining both the first and second insulating layers therebetween.

8. The method of claim 7, further including enclosing electronic components within the housing.

9. The method of claim 8, further including electrically connecting the electrically conductive wire to the electronic components to provide power to the electronic components.

10. The method of claim 8, further including electrically connecting the housing to the electronic components to act as a ground for the electronic components.

11. A hermetically sealed electrical connection comprising:
    an electrically conductive wire;
    an insulator surrounding the electrically conductive wire; and
    a metal layer surrounding the insulator and the electrically conductive wire, the metal layer compressed against the insulator and the insulator compressed against the electrically conductive wire by a magnetically-induced compressive force such that a hermetic seal is formed between the electrically conductive wire and the metal layer.

12. The hermetically sealed electrical connection of claim 11, wherein the metal layer is a tube.

13. The hermetically sealed electrical connection of claim 12, wherein the insulator is an oxide formed on the tube.

14. The hermetically sealed electrical connection of claim 11, wherein no brazing material is present between the electrically conductive wire and the metal layer.

15. The hermetically sealed electrical connection of claim 11, wherein the insulator remains present and sandwiched between the electrically conductive wire and the metal layer.

16. The hermetically sealed electrical connection of claim 11, wherein no metal-to-metal welding occurs with the metal layer and the electrically conductive wire.

17. The hermetically sealed electrical connection of claim 11, further including an active metal compound layer between at least one of the metal layer and the insulator, and the insulator and the electrically conductive wire.

18. The hermetically sealed electrical connection of claim 11, wherein the insulator is a first insulator and wherein the hermetically sealed electrical connection further includes:
    a second insulator surrounding the metal layer; and
    a housing surrounding the second insulator, the housing compressed against the second insulator, the second insulator compressed against the metal layer, the metal layer compressed against the first insulator, and the first insulator compressed against the electrically conductive wire by the magnetically-induced compressive force such that a hermetic seal is formed between the electrically conductive wire and the housing.

19. The hermetically sealed electrical connection of claim 18, wherein the metal layer is a tube.

20. The hermetically sealed electrical connection of claim 19, wherein the first and second insulators are an oxide formed on the tube.

21. The hermetically sealed electrical connection of claim 18, wherein the hermetically sealed electrical connection is part of an electronic component in a wet fuel environment, the hermetic seal being substantially impermeable to the wet fuel.

* * * * *